United States Patent [19]
Ezoe

[11] 4,422,421
[45] Dec. 27, 1983

[54] COMBUSTION KNOCK PREVENTING APPARATUS FOR AN INTERNAL COMBUSTION ENGINE

[75] Inventor: Mitsuhiko Ezoe, Yokosuka, Japan

[73] Assignee: Nissan Motor Co., Ltd., Yokohama, Japan

[21] Appl. No.: 211,194

[22] Filed: Nov. 28, 1980

[30] Foreign Application Priority Data

Nov. 30, 1979 [JP] Japan .................. 54-165646[U]
Jun. 6, 1980 [JP] Japan .................. 55-77982[U]

[51] Int. Cl.³ ............................. F02P 5/04
[52] U.S. Cl. ..................... 123/424; 123/179 BG; 123/425
[58] Field of Search ............ 123/419, 435, 436, 425, 123/421, 179 BG, 424

[56] References Cited

U.S. PATENT DOCUMENTS 4,002,155 1/1977 Harned et al. .
4,036,199 7/1977 Chateau .................. 123/419
4,153,020 5/1979 King et al. .
4,178,893 12/1979 Aoki .................. 123/179 BG
4,246,493 1/1981 Beeghly .

FOREIGN PATENT DOCUMENTS 2056560 3/1981 United Kingdom .......... 123/425

Primary Examiner—Ronald B. Cox
Attorney, Agent, or Firm—Lane, Aitken & Kananen

[57] ABSTRACT

A combustion knock detection signal for retarding the ignition timing of the internal combustion engine is disabled upon detection of an unstable condition of the storage battery voltage level. Switching means is provided which is operative in response to the unstable condition of the voltage level of the storage battery to disable the knock detection signal, thereby eliminating the production of a false knock detection signal during the engine cranking operation or a certain period after the starting of the engine in which the engine speed is lower than a predetermined level.

5 Claims, 8 Drawing Figures

COMBUSTION KNOCK PREVENTING APPARATUS FOR AN INTERNAL COMBUSTION ENGINE

BACKGROUND OF THE INVENTION

1. Field of the Invention

The present invention generally relates to a combustion knock preventing apparatus for internal combustion engine. More specifically, the present invention relates to an improvement in a combustion knock preventing apparatus which retards the ignition timing to decrease the occurrence of the combustion knock in an internal combustion engine in response to a monitoring signal produced by a knock sensor.

2. Description of the Prior Art

Combustion knock of an internal combustion engine occurs when the ignition timing is too far advanced and a high load is put on the engine. It is well known that continued engine operation under a high intensity of combustion knock results in damage to the engine. However, it is also well known that an optimum engine output performance and fuel consumption characteristics are obtained when it is operated under a slight knock condition.

There is a close relationship between the ignition timing and the occurrence of combustion knock. Generally, the combustion knock increases as the degree of the advancement of the ignition timing increases.

As the ignition timing is advanced up to the point where the combustion knock occurs, retarding the engine timing is effective to prevent too much combustion knock. In some conventional combustion knock preventing apparatuses, there are provided a sensor monitoring the combustion knock condition, and an ignition timing controller for retarding the ignition timing when the engine knocks too much so as to maintain the engine operation under a slight knock condition, thereby improving the engine output performance and the fuel consumption characteristics.

The sensor generally comprises a vibration sensor connected to the engine cylinder head for converting the vibration caused by the combustion knock into an electric signal. The output signal of the vibration sensor is compared with a reference signal to produce an output signal for actuating the ignition timing controller.

However, if the ignition timing controller receives a false knock detection signal at low engine speed, as when the battery power is too low to produce an accurate reference signal, it will automatically retard the ignition timing. When this happens, the engine may stall. Similarly, if this happens during engine cranking operation, it may make the engine difficult to start.

SUMMARY OF THE INVENTION

According to the present invention, an ignition timing retarding operation for preventing the combustion knock is temporarily disabled when the voltage of the storage battery remains unstable, for example, during the engine cranking operation or when the rotational speed of the engine is below a predetermined low level, thereby eliminating the malfunction of the combustion knock preventing apparatus.

The present combustion knock preventing apparatus comprises means for producing a knock detection signal upon detection of the occurrence of the combustion knock in the cylinders of the engine, means for controlling the ignition timing of the engine in accordance with the knock detection signal, and means for disabling the knock detection signal upon detection of an unstable condition of the voltage level of the storage battery.

An object of the invention therefore is to improve the conventional combustion knock preventing apparatus by eliminating the drawbacks as above.

BRIEF DESCRIPTION OF THE DRAWINGS

The features and advantages of the apparatus according to the present invention will be more clearly appreciated from the following description taken in conjunction with the accompanying drawings in which like reference numerals designate corresponding elements, and in which.

DESCRIPTION OF THE PREFERRED EMBODIMENT

Referring to the accompanying drawings, and more particularly to FIGS. 1 through 4, the first embodiment is explained.

Figure 1:
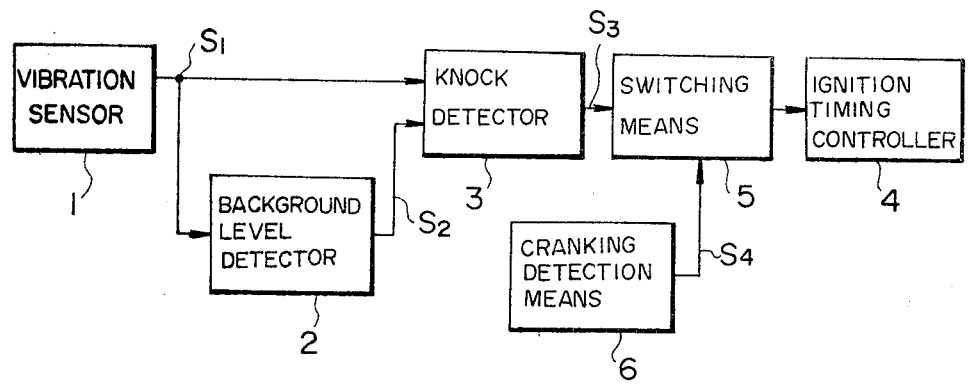
FIG. 1 is a schematic diagram of a first embodiment of a combustion knock preventing apparatus according to the present invention.

As shown in FIG. 1, the combustion knock preventing apparatus comprises a vibration sensor 1 for sensing the vibration of engine, a background level detector 2 connected to the vibration sensor 1, a knock detector 3 for producing a knock detection signal $S_3$ by comparing the output signal $S_1$ of the vibration sensor 1 and the output signal $S_2$ of the background level detector 2, and an ignition timing controller 4 for controlling the ignition timing in accordance with the knock detection signal $S_3$. A switching means 5 is interposed between the knock detector 3 and the ignition timing controller 4 for selectively disabling the transmission of the knock detection signal $S_3$ produced by the knock detector 3 to the ignition timing controller 4. A cranking detection means 6 is provided which produces a high level output signal $S_4$ when it detects the engine cranking operation.

The vibration sensor 1 is a resonance type sensor which has a resonance frequency within a range of the frequency from 6 to 8 kHz at which the engine vibrates due to the knocking. Alternatively, instead of the resonance type sensor, a non-resonance type vibration sensor combined with a bandpass filter may be used.

The background level detector 2 is in the form of a smoothing circuit which uses a resistor and a capacitor. The smoothing circuit is operative to smooth the output signal $S_1$ to produce the output signal $S_2$ which represents the background level, viz., a level corresponding to the noise level of the engine.

The knock detector $S_3$ comprises a comparator and produces the knock detection signal $S_3$ when the signal $S_1$ exceeds the signal $S_2$ by a predetermined value. The occurrence of the signal $S_3$ means the occurrence of knocking.

The ignition timing controller 4 retards the ignition timing than usual when its receives the knock detection signal $S_3$.

The voltage level of the output signal $S_1$ of the vibration sensor 1 rises when the engine speed increases; however, the knock detector 3 does not produce a knock detection signal $S_3$ until the combustion knock actually occurs, since the voltage level of the output signal $S_2$ of the background level detector 2 also rises in accordance with the engine speed.

Figure 4:
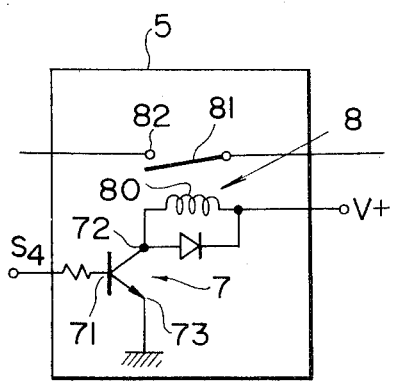
FIG. 4 is a circuit diagram of the switching means shown in FIG. 1.

As shown in FIG. 4, the switching means 5 comprises a transistor 7 and a relay 8. The relay 8 has a relay coil 80 and a pair of contacts 81 and 82. A terminal of the relay coil 80 is connected to the collector 72 of the transistor 7 and the other terminal thereof is connected to an electric power source. The base 71 of the transistor 7 is supplied with a high level output signal $S_4$ of the cranking detection means 6 through a resistor connected thereto, and the emitter 73 thereof is connected to the ground. When the engine cranking operation is detected by the cranking operation means 6, the transistor 7 turns conductive by the application of the high level output signal $S_4$ at the base 71 thereof. The relay 8 is energized by the operation of this transistor 7 and opens its normally closed relay contacts 81 and 82 during engine cranking operation. Thus, the transmission of the knock detection signal $S_3$ is disabled during the engine cranking operation.

It will be appreciated from the foregoing that the production of the false knock signal and undesirable retardation of the ignition timing is prevented during the engine cranking operation.

Figure 5:
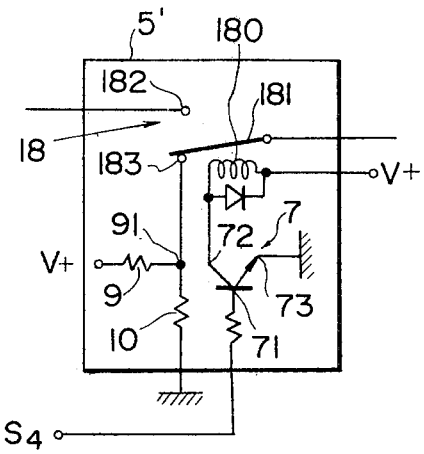
FIG. 5 is a circuit diagram of alternative example of the switching means of FIG. 4.

FIG. 5 shows another example of the switching means which is now denoted by the reference numral 5'. In the case of this switching means 5', a relay 18 has three relay contacts 181, 182 and 183, the latter of which is connected to a junction 91 of series-connected resistors 9 and 10. These series resistors 9 and 10 are applied with a predetermined positive voltage, for example, a battery voltage at one terminal thereof. When the transistor 7 turns conductive, the movable contact 181 of the relay 18 moves from the contact 182 to the contact 183 so that the control device 4 is applied with a predetermined voltage produced at the junction 91 of the resistors 9 and 10. The voltage level produced by these resistors 9 and 10 is selected to have a value which provides an ignition timing suitable for the engine starting operation. The switching means 5' thus makes it easy to start the engine.

Figure 2:
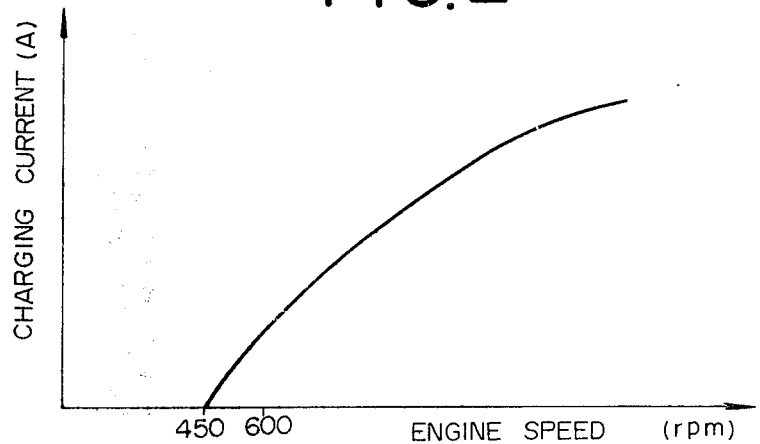
FIG. 2 is a graph showing a relationship between the engine speed and the magnitude of the battery charging current.

FIG. 2 shows the relationship between the magnitude of the charging current for the storage battery produced by a generator driven by the engine and the engine speed. As shown, the charging current for the storage battery develops when the engine speed exceeds a level (for example, 450 rpm) slightly below the engine idling speed (normally about 600 rpm). Therefore, the voltage level of the storage battery remains unstable and varies within a range below the rating voltage of 12 V until the engine speed rises above a predetermined level (450–700 rpm) after the engine starts self rotation.

Figure 3:
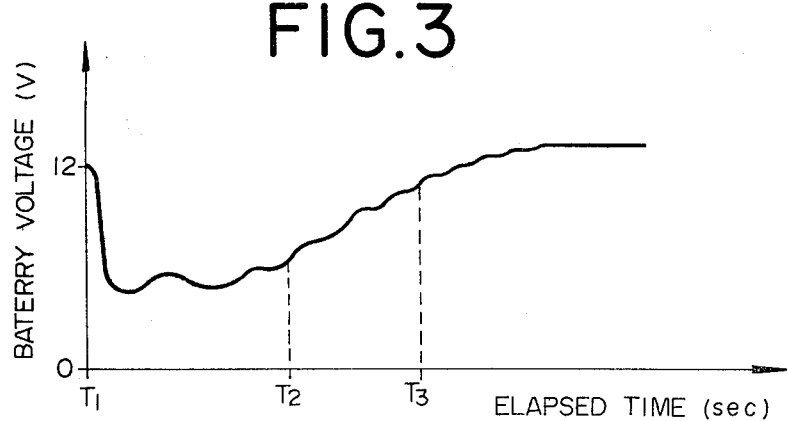
FIG. 3 is a graph showing a relationship between the elapsed time after the starting of the engine and the voltage of the storage battery.

FIG. 3 shows the relationship between the elapsed time after the starting of the engine and the battery voltage, wherein $T_1$ designates the cranking start point and $T_2$ an instance when the engine starts self rotation.

As shown in FIG. 3, the voltage level of the storage battery remains below 12 volts and increases in an unstable manner during the period from $T_2$ to $T_3$, that is, the period required for the engine speed to reach a predetermined level after the engine begins to rotate by itself.

Figure 6:
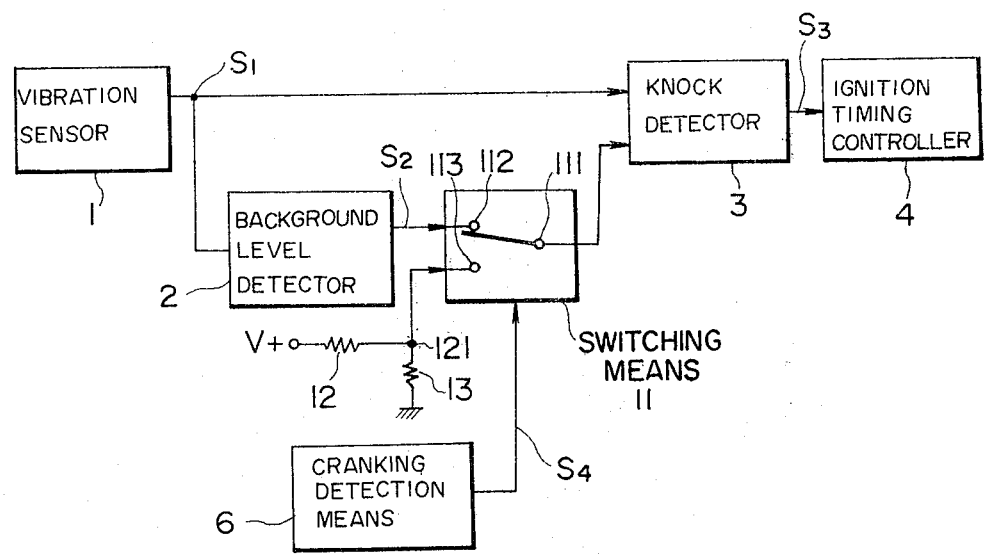
FIG. 6 is a schematic diagram of a second embodiment according to the present invention.

FIG. 6 shows the second embodiment according to the present invention.

As shown, a switching means 11 controlled by an output signal of a cranking detection means 6 is provided between a background level detector 2 and a knock detector 3 in the case of this embodiment. The knock detector 3 is supplied with the output signal $S_1$ of a vibration sensor 1 and an output signal of the switching means 11. The switching means 11 includes therein a movable contact 111 and two stationary contacts 112 and 113 respectively connected to the output terminal of the background level detector 2 and to a junction 121 of series-connected resistors 12 and 13. When the engine cranking operation is detected by the cranking detection means 6, the movable contact 111 of the switching means 11 moves from one stationary contact 112 to the other stationary contact 113. The resistors 12 and 13 are supplied with a high potential battery voltage at a terminal thereof and produce a high voltage reference signal at the junction 121 thereof. By this arrangement, the knock detector 3 is provided with the high level reference signal in place of the output signal $S_2$ of the background level detector 2 during the engine cranking operation. Therefore, the knock detector 3 does not produce the knock detection signal $S_3$ unless an extremely high intensity signal is provided by the vibration sensor 1. In effect, such a high level output signal is not produced by the vibration sensor 1 in the usual engine operation. Thus, the production of the knock detection signal $S_3$ is substantially disabled. Accordingly, almost the same function for preventing the production of a false knock detection signal $S_3$ as the previously explained embodiment is obtained by this arrangement.

Figure 7:
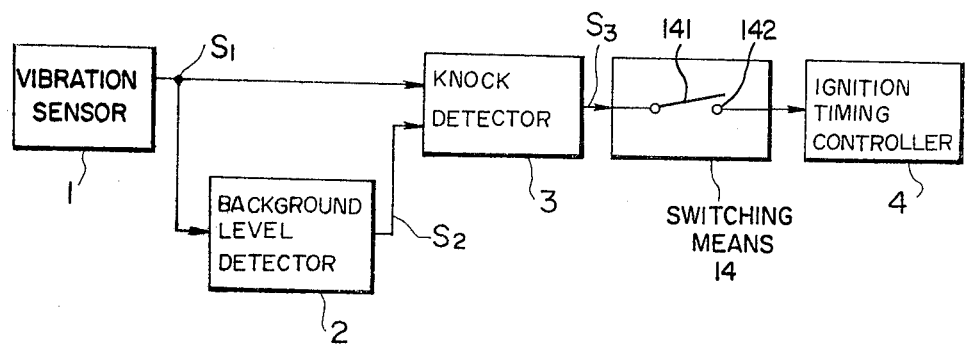
FIG. 7 is a schematic diagram of a third embodiment according to the present invention.

FIG. 7 shows the third embodiment of the present invention. As shown, a switching means 14 is provided between a knock detector 3 and a control device 4 in a similar manner to the first embodiment of the present invention. However, in this embodiment, the switching means 14 operates in response to the engine speed so as to close its switch contacts 141 and 142 when the engine speed rises up to a predetermined level. By the provision of this switching means 14, the output signal $S_3$ of the knock detector 3 is disabled when the engine speed remains below a predetermined low level. Thus, the malfunction of the apparatus is prevented even if a false knock detection signal $S_3$ is produced during the unstable condition of the storage battery. This switching means 14 may take the form of a mechanical rotational speed sensor arranged to close its contacts when the engine speed rises up to a predetermined level.

The mechanical speed sensor is fit for use in this knock preventing apparatus due to the fact that the switching operation thereof is not affected by the voltage level of the storage battery.

Figure 8:
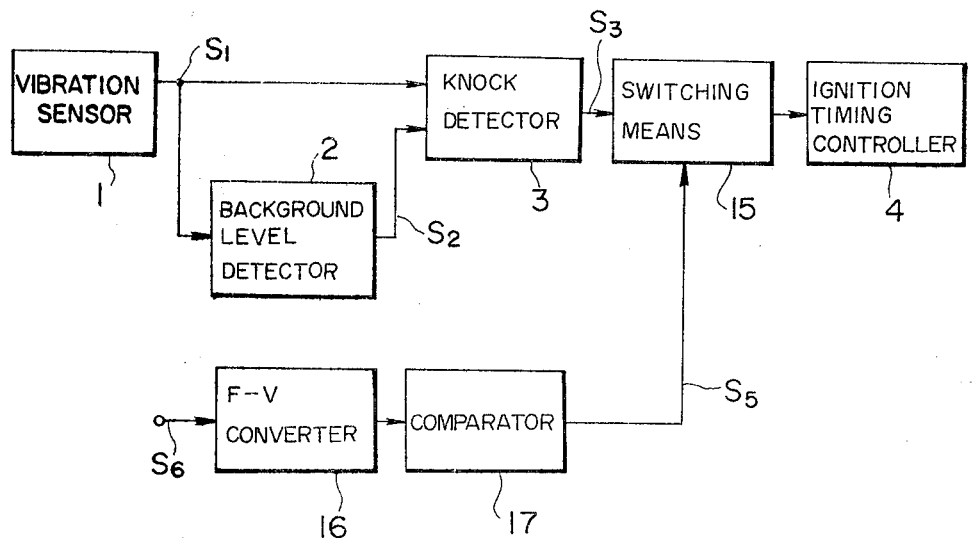
FIG. 8 is a schematic diagram of a fourth embodiment according to the present invention.

FIG. 8 shows the fourth embodiment according to the present invention. This fourth embodiment is similar to the third embodiment shown in FIG. 7, however, in this embodiment, the switching means 14 is replaced by an elctric switching means 15 such as a relay or an analog switch. In addition to this electirc switching means 15, a frequency to voltage converter 16 responsive to a frequency signal S<sub>6</sub> representing the engine speed and a comparator 17 are provided in the apparatus. In this case, the ignition timing signal may be used as the frequency signal $S_6$. The output signal of the frequency to voltage converter 16 is compared with a predetermined reference signal within the comparator 17 which produces a high level output signal $S_5$ when the voltage level of the output signal of the frequency to voltage converter 16 is above the voltage level of the reference signal. By the above described arrangement, the output signal $S_3$ of the knock detector 3 is disabled when the engine speed is below a predetermined level. Furthermore, it is to be noted that the electrical switching means 15 and the electrical circuits 16 and 17 may be designed to be operable even if the voltage level of the electric power supply reduces by a considerable amount since these circuits require accuracy of operation.

As is easily understood from FIG. 2, the engine speed for actuating this switching means 14 or 15 is preferably selected within the range of 450 to 700 rpm at which the voltage level of the storage battery becomes stable. However, which rotational speed is to be determined below the engine idling speed so as to avoid an adverse effect on the normal function of this combustion knock preventing apparatus during the normal operation of the engine.

It will be appreciated from the foregoing that, according to the present combustion knock preventing apparatus, the function for retarding the basic ignition timing is disabled during the period in which the voltage level of the storage battery remains unstable, thereby avoiding the malfunction of the apparatus and thereby ensuring the stable engine operation especially during and also a certain period after the engine starting operation.

What is claimed is:

1. A combustion knock preventing apparatus for an internal combustion engine, comprising:
    an ignition system for the internal combustion engine;
    a cranking operation detecting means for generating an output signal upon detecting the cranking operation of the internal combustion engine;
    a vibration sensor means for sensing the vibration of the engine to generate an output signal indicative of the sensed vibration;
    a background level detecting means for generating an output signal indicative of the background vibration of the internal combustion engine;
    means for generating a constant signal which is higher than said output signal of said background level detecting means;
    a knock detecting means having a first input connected to said vibration sensor means for receiving said output signal of said vibration sensor means and a second input receiving a reference signal, said knock detecting means comparing said output signal of said vibration sensor means with said reference signal supplied to said input signal to generate a knock detection signal when said output signal of said vibration sensor means is higher than said reference signal supplied to said input signal;
    means responsive to said output signal of said cranking operation detecting means for supplying said output signal of said background level detector means to said second input of said knock detecting means as said reference signal in response to the absence of said output signal of said cranking operation detecting means and supplying said constant signal to said second input of said knock detecting means as said reference signal in response to the presence of said output signal of said cranking operation detecting means; and
    means operatively connected with said ignition system for retarding the ignition timing in response to said knock detection signal.

2. A combustion knock preventing apparatus for an internal combustion engine with an ignition system and a storage battery for supplying an electric power for the cranking operation thereof, comprising:
    means for producing a knock detection signal upon detection of the occurrence of the combustion knock in the cylinders of said engine, said producing means being supplied with an electric power voltage from said storage battery and comprising:
        a vibration sensor for providing an output signal by sensing the magnitude of the vibration of said engine;
        a background level detector for producing an output signal indicative of the background vibration level of said engine; and
        a knock detector for producing said knock detection signal by comparing the output signal of said vibration sensor with the output signal of the background level detector;
    means for controlling the ignition timing of said ignition system in accordance with the knock detection signal produced by said producing means; and
    means for disabling said knock detection signal upon detection of an unstable condition of the voltage level of said storage battery, said disabling means comprising a switching means disposed between said background level detector and said knock detector and responsive to the unstable condition of the voltage level of said storage battery, said switching means selectively providing a signal into said knock detector upon detection of said unstable condition of said storage battery.

3. An apparatus as claimed in claim 2, wherein said switching means is responsive to the cranking operation of said engine.

4. An apparatus as claimed in claim 2, wherein said switching means is actuated when the rotational speed of said engine is below a predetermined level lower than the idle speed of the engine.

5. An apparatus as claimed in claim 3, wherein said disabling means comprises an engine cranking detection means for actuating said switching means.

* * * * *